United States Patent
Mualem et al.

(10) Patent No.: US 7,124,293 B2
(45) Date of Patent: Oct. 17, 2006

(54) INTELLIGENTLY DETERMINING WHICH TRAFFIC STREAMS TO OFFLOAD EFFICIENTLY

(75) Inventors: Avraham Mualem, Portland, OR (US); Linden Minnick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 09/895,344

(22) Filed: Jun. 29, 2001

(65) Prior Publication Data

US 2003/0005283 A1 Jan. 2, 2003

(51) Int. Cl.
*H04L 9/00* (2006.01)

(52) U.S. Cl. .................... 713/151; 713/150
(58) Field of Classification Search ............... 370/238; 713/151
See application file for complete search history.

(56) References Cited

U.S. PATENT DOCUMENTS

| | | | |
|---|---|---|---|
| 5,937,169 A | 8/1999 | Connery et al. | |
| 5,978,912 A | 11/1999 | Rakavy et al. | |
| 6,052,733 A | 4/2000 | Mahalingam et al. | |
| 6,105,151 A | 8/2000 | Mahalingham et al. | |
| 6,134,678 A | 10/2000 | Mahalingham et al. | |
| 6,141,705 A * | 10/2000 | Anand et al. ............ | 710/15 |
| 6,192,388 B1 | 2/2001 | Cajolet | |
| 6,208,616 B1 | 3/2001 | Mahalingham et al. | |
| 6,209,101 B1 * | 3/2001 | Mitchem et al. ............ | 726/2 |
| 6,253,334 B1 | 6/2001 | Amdahl et al. | |
| 6,314,525 B1 | 11/2001 | Mahalingham et al. | |
| 6,327,614 B1 | 12/2001 | Asano et al. | |
| 6,392,990 B1 | 5/2002 | Tosey et al. | |
| 6,477,646 B1 * | 11/2002 | Krishna et al. ............ | 713/189 |
| 6,490,632 B1 | 12/2002 | Vepa et al. | |
| 6,512,774 B1 | 1/2003 | Vepa et al. | |
| 6,560,630 B1 | 5/2003 | Vepa et al. | |
| 6,590,861 B1 | 7/2003 | Vepa et al. | |
| 6,665,306 B1 * | 12/2003 | Thakur et al. ............ | 370/419 |
| 6,697,334 B1 * | 2/2004 | Klincewicz et al. ........ | 370/238 |
| 6,708,218 B1 * | 3/2004 | Ellington et al. ........... | 709/236 |
| 6,765,931 B1 * | 7/2004 | Rabenko et al. ............ | 340/493 |
| 2002/0062333 A1 * | 5/2002 | Anand et al. ................ | 709/105 |
| 2003/0005281 A1 * | 1/2003 | Cihula ........................ | 713/151 |

OTHER PUBLICATIONS

U.S. Appl. No. 09/476,612, Diamant.

* cited by examiner

*Primary Examiner*—Ayaz Sheikh
*Assistant Examiner*—Eleni Shiferaw
(74) *Attorney, Agent, or Firm*—Blakely, Sokoloff, Taylor & Zafman LLP

(57) ABSTRACT

A method and apparatus for intelligently determining which traffic streams to offload efficiently. A metric value is associated with a Security Association (SA) for each network traffic stream coupled to an electronic system. The metric is used to determine which of multiple methods to perform cryptography operations should be used to handle which streams. The metric is modified based on network traffic, and increased when the SA is cached. The metric of all SAs is periodically decreased. In one embodiment, a network interface driver determines which SAs should be cached on a network interface card and handled using Inline Receive, and which SAs should not be cached and handled using Secondary Use. Cached SAs are replaced by non-cached SAs only if the metric value of a non-cached SA is greater than the metric value of a cached SA by at least a predetermined amount representing the cost of cache replacement.

27 Claims, 7 Drawing Sheets

INTELLIGENTLY DETERMINING WHICH TRAFFIC STREAMS TO OFFLOAD EFFICIENTLY

FIELD OF THE INVENTION

The present invention relates to performing cryptography operations on data streams. More particularly, the present invention relates to IP security offload.

BACKGROUND OF THE INVENTION

IP Security (IPsec) standard, IP Security Internet Engineering Task Force (IETF) Request for Comments (RFC) 2401, published November 1998, is one method of protecting both the confidentiality and integrity of data transferred on a network. Because IPsec provides a way to encrypt and decrypt data below the Transmission Control Protocol (TCP)/User Datagram Protocol (UDP) layer, the protection is transparent to applications that transfer data. Thus, a system may utilize IPsec without requiring changes at the application level. However, the algorithms used for cryptography (crypto) operations (e.g., encryption, decryption, authentication) on the data for IPsec require many processor cycles to execute. The processor cycles spent on crypto operations decrease the cycles available to applications and other parts of the protocol stack. This in turn decreases throughput in the system.

One solution to this problem is to offload the crypto operations to an external piece of hardware, such as a Network Interface Card (NIC). One way to offload the crypto operations is by encrypting data immediately before transmitting a packet and decrypting data directly from the wire before the packet is transferred via Direct Memory Access (DMA) to host memory. A Security Association (SA) is a data structure of cryptography information that contains all of the information necessary to perform crypto operations on a packet. The device that interfaces the system to the network, for example a NIC, detects which SA is needed to process the packet and performs crypto operations on the packet directly from the wire. The process for performing crypto operations on ingress data before it is transferred to host memory is called "Inline Receive."

Another solution is to offload using the "Secondary Use" model. This model uses an out-of-band acceleration method to decrypt receive packets. In this scenario, all received packets are DMA transferred to host memory. The network interface driver then parses each received packet to match it with its corresponding Security Association (SA). Assuming that the crypto accelerator is on the NIC, the driver then instructs the NIC to transfer the packet across the bus, perform the crypto operation on the packet, and then transfer the packet back to host memory. Secondary Use results in inefficient use of the available bandwidth on the system bus because the packet is transferred across the bus three times. Secondary Use also creates additional latency, which can degrade the throughput of protocols sensitive to the round trip time of packets (e.g., TCP). Furthermore, performing the extra transfers across the bus often requires the use of an additional interrupt, causing the system to do more work, and increasing CPU utilization.

The network interface driver must determine which traffic streams will be handled using Inline Receive, and which traffic streams will be handled using either Secondary Use or software processing. A traditional approach is to add SAs to the Inline Receive cache on a first come, first served basis. Under the traditional approach, packets associated with SAs in the cache will be handled using Inline Receive. Once there are no available entries in the cache, packets for non-cached SAs must be handled using either Secondary Use or software processing.

From a performance perspective (both processor utilization and throughput), Inline Receive is a more efficient solution than Secondary Use. On the other hand, Inline Receive is expensive to implement in hardware because the SAs necessary for the crypto operations must be stored in an SA cache on the NIC. Because of this, the number of connections that can use Inline Receive is often limited. Because it is common for the number of open connections to exceed the size of the Inline Receive cache, the other connections must use the Secondary Use model in order to offload secure traffic.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

Figure 1:
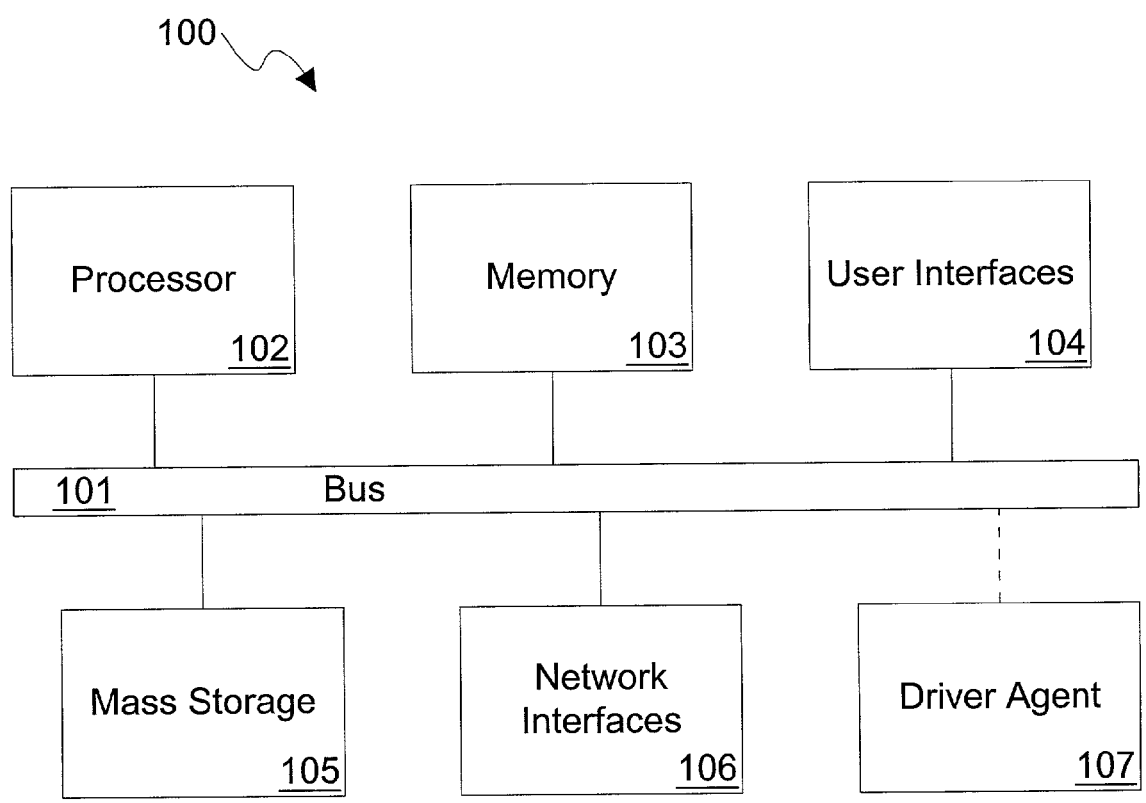
FIG. 1 is one embodiment of a block diagram of an electronic system.

Methods and apparatuses for dynamically mapping traffic streams to one of multiple methods to perform cryptography operations based on network traffic analysis are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

Briefly, a technique for associating a metric value with a Security Association (SA) for each network traffic stream coupled through a network interface to an electronic system is described. The metric is used to determine which of multiple methods to perform cryptography (crypto) operations (e.g., encryption, decryption, authentication) should be used to handle which streams.

The crypto operations can be offloaded to improve system performance. Offloading is a process whereby the system processor does not perform the crypto operations. One form of offloading is "Inline" Operation. With Inline Operation, hardware external to the system processor, for example a processor or co-processor on a Network Interface Card (NIC), performs the crypto operations directly off the wire. For example, a packet entering the system would be operated on before the packet was transferred to host memory. Another method is "Secondary Use." With Secondary Use, a driver agent, for example a software network interface driver, uses hardware external to the system processor, for example a processor or co-processor on a NIC, to perform the operations. For example, a packet entering the system would be transferred to host memory, and the network interface driver would instruct the NIC hardware to process the packet. Inline Receive is a more efficient method of offloading than Secondary Use in terms of system performance.

In one embodiment, an electronic system uses a predetermined policy to decide to handle one network traffic stream with Inline Operation and another network traffic stream with the Secondary Use model. For example, a network traffic stream with heavy traffic will be handled with Inline Receive, and a network traffic stream with lesser traffic will be handled with the Secondary Use model. By determining which of multiple methods to perform crypto operations to use with which traffic streams, system performance is increased.

FIG. 1 is one embodiment of an electronic system. Electronic system 100 may be, for example, a computer, a Personal Digital Assistant (PDA), a set top box, or any other electronic system. System 100 includes bus 101 or other communication device to communicate information, and processor 102 coupled with bus 101 to process information and to execute instructions. System 100 further includes memory 103, coupled to bus 101 to store information and instructions to be executed by processor 102. Memory 103 may also be used to store temporary variables or other intermediate information during execution of instructions by processor 102. Memory 103 may include random access memory (RAM), read-only memory (ROM), flash, or other static or dynamic storage media.

User interfaces 104 are coupled to bus 101 too allow interaction with a user. Mass storage 105 can be coupled to system 100 to provide instructions to memory 103. Mass storage 105 can be, for example, a magnetic disk or optical disc and its corresponding drive, a memory card, or another device capable of storing machine-readable instructions. Network interfaces 106 can be coupled to bus 101 to enable system 100 to communicate with other electronic systems via a network. Driver agent 107 may be coupled to system 100 to perform driver features in hardware. Driver agent 107 may be an Application Specific Integrated Circuit (ASIC), a special function controller or processor, a Field Programmable Gate Array (FPGA), or other hardware device to perform the functions of a driver. Driver agent 107 is not a necessary part of system 100.

Electronic system 100 can improve system performance by determining which components of system 100 should handle traffic streams coupled to bus 101 by network interfaces 106. According to one embodiment, a driver agent determines which traffic streams should be mapped to more efficient techniques of performing crypto operations based on the value of a corresponding SA metric. For example, the driver agent can use a predetermined policy to compare metric values and use the most efficient technique to handle traffic stream corresponding to the highest metric value. The driver agent can be driver agent 107 or a software driver agent incorporated from a series of machine-readable instructions stored within memory 103.

Instructions can be provided to memory 103 from a storage device, such as magnetic disk, CD-ROM, DVD, via a remote connection (e.g., over a network), etc. In alternative embodiments, hard-wired circuitry can be used in place of or in combination with software instructions to enable system 100 to practice the present invention. Thus, the electronic system depicted above is not limited to any specific combination of hardware circuitry and software structure.

Instructions can be provided to memory 103 from a form of machine-accessible medium. A machine-accessible medium includes any mechanism that provides (i.e., stores and/or transmits) information in a form readable by a machine (e.g., a computer). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Figure 2:
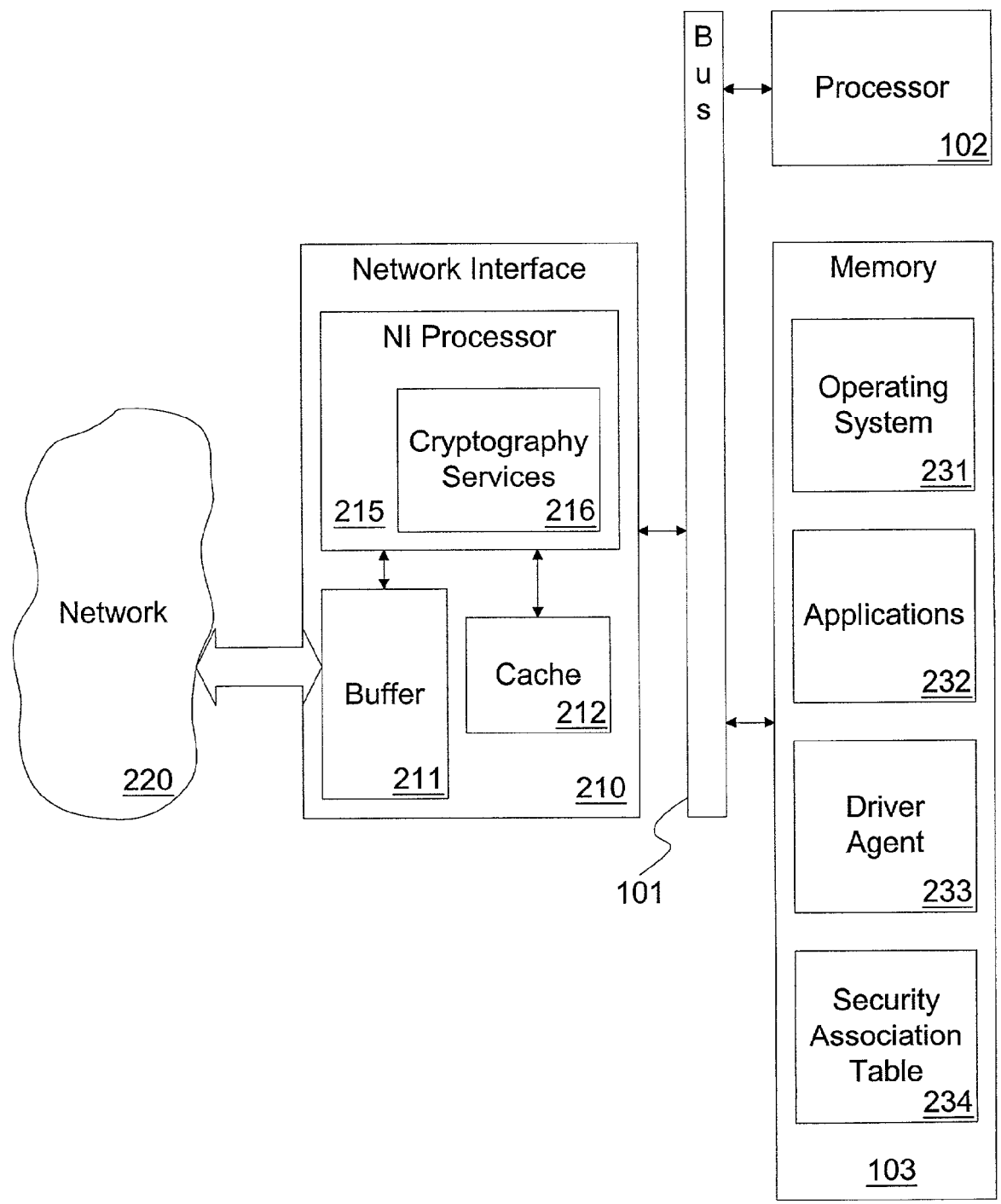
FIG. 2 is one embodiment of a block diagram of a network interface system.

FIG. 2 is one embodiment of a block diagram of a network interface system coupled to a network. In one embodiment, Network Interface (NI) 210 is a communication interface that enables an electronic system to communicate with other electronic systems coupled to network 220. For example, NI 210 can be a Network Interface Card (NIC). In one embodiment, traffic streams are received from network 220 into buffer 211 on NI 210. NI processor 215 determines whether NI 210 has the SA information in cache 212 necessary to perform crypto operations on the packet. If the SA information is in cache 212, crypto services 216 handles the packet. If the SA information is not in cache 212, the packet is transferred across bus 101 to memory 103.

Memory 103 contains operating system (OS) 231 which controls the flow of instructions to processor 102. In one embodiment, OS 231 is the highest layer of control of the electronic system. Driver agent 233 is a lower layer of system control. In one embodiment, SAs are delivered to driver agent 233 by OS 231. In another embodiment, applications 232 can contain agents of a higher layer of control than driver agent 233 and deliver SAs to driver agent 233. Applications 232 can also contain other programs (e.g., word processor(s); electronic mail (e-mail) programs). Memory 103 also contains SA table 234 that is a data structure of SAs. In one embodiment, driver agent 233 accesses SA table 234 to determine how to map traffic streams to one of multiple components that perform crypto operations. In one embodiment, crypto services 216 and driver agent 233 are components that perform crypto operations.

Processor 102 performs operations based on instructions received from memory 103. For example, sets of instructions can control timers for use by functions that must be performed on a periodic basis. In one embodiment, driver agent 233 responds to the use of a timer to periodically determine whether SA entries of cache 212 should be replaced by non-cached SAs.

Figure 3:
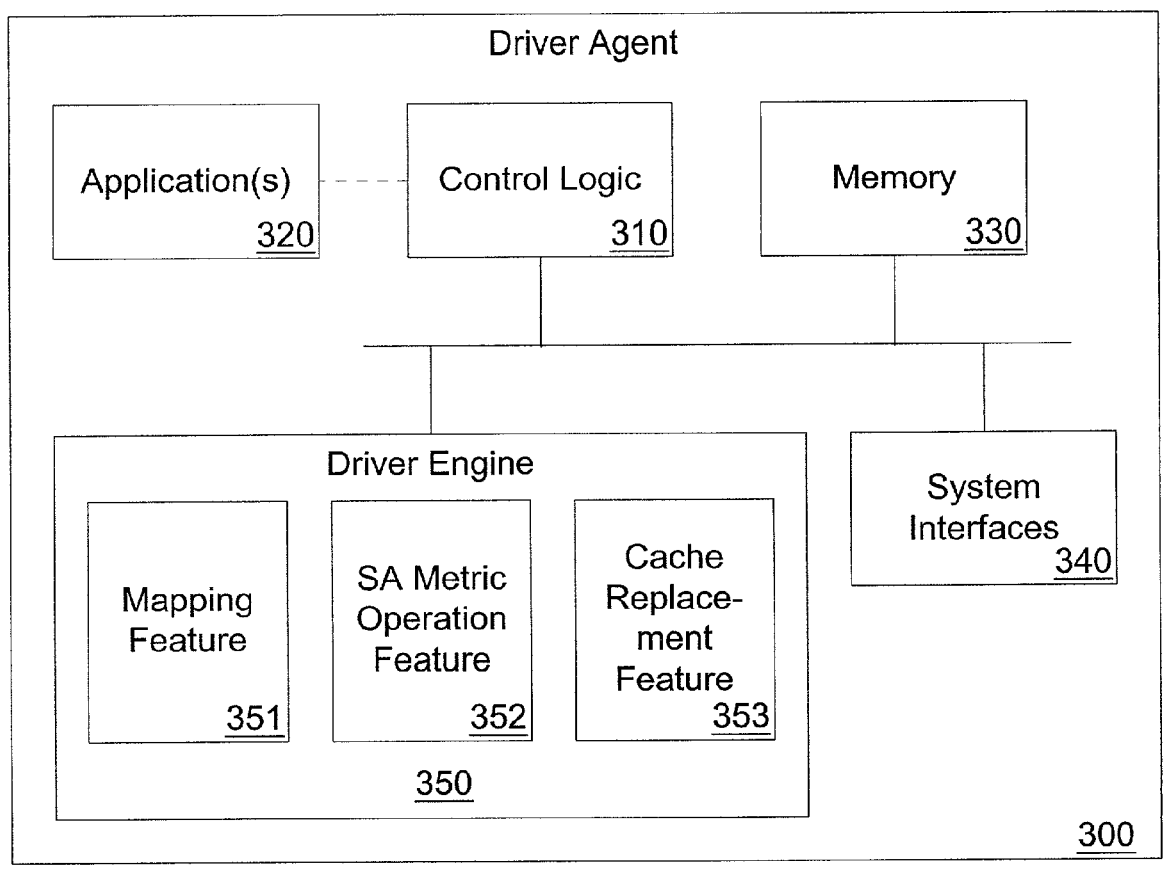
FIG. 3 is one embodiment of a block diagram of a driver agent.

FIG. 3 is one embodiment of a block diagram of a driver agent. Control logic 310 directs the flow of operation of driver agent 300. In one embodiment, control logic 310 is a series of software instructions to perform logic operations. In another embodiment, control logic 310 can be implemented by hardware control logic, or a combination of hardware-based control logic and software instructions.

System interfaces 340 couples driver agent 300 to an electronic system. For example, in one embodiment, driver agent 300 can be part of a computer system and system interfaces 340 couples driver agent 300 to the computer system via a system bus. Thus, control logic 310 can receive a series of instructions from application software external to driver agent 300. Driver agent 300 is not limited to being local to an electronic system. For example, system interfaces 340 may couple driver agent 300 to an electronic system through a network.

In one embodiment, driver agent 300 may contain applications 320. Thus, applications 320 can supplement external instructions to control logic 310. Applications 320 are not necessary to the function of driver agent 300.

In one embodiment, mapping feature 351 dynamically maps traffic streams to one of multiple components that perform crypto operations. For example, mapping feature 351 can enable driver agent 300 to direct a NIC to handle a packet received into host memory by the Secondary Use model. In one embodiment, SA metric operation feature 352 enables driver agent 300 to operate on the value of SA metrics. For example, driver agent 300 can initialize, increment, add value to, or decrease the SA metrics.

In one embodiment, cache replacement feature 353 enables driver agent 300 to intelligently replace SA entries in a cache. For example, cache replacement feature 353 can enable driver agent 300 to determine whether to replace entries in an SA cache on a NIC based on SA metric values. Mapping feature 351, SA metric operation feature 352, and cache replacement feature 353 can exist independently of and be external to driver agent 300. For example, upper layers of an electronic system may perform the same or similar functions as mapping feature 351, SA metric operation feature 352, and cache replacement feature 353. Likewise, driver engine 350 may exist as a more complex or less complex embodiment, containing some, all, or additional features to those represented in FIG. 3.

Figure 4:
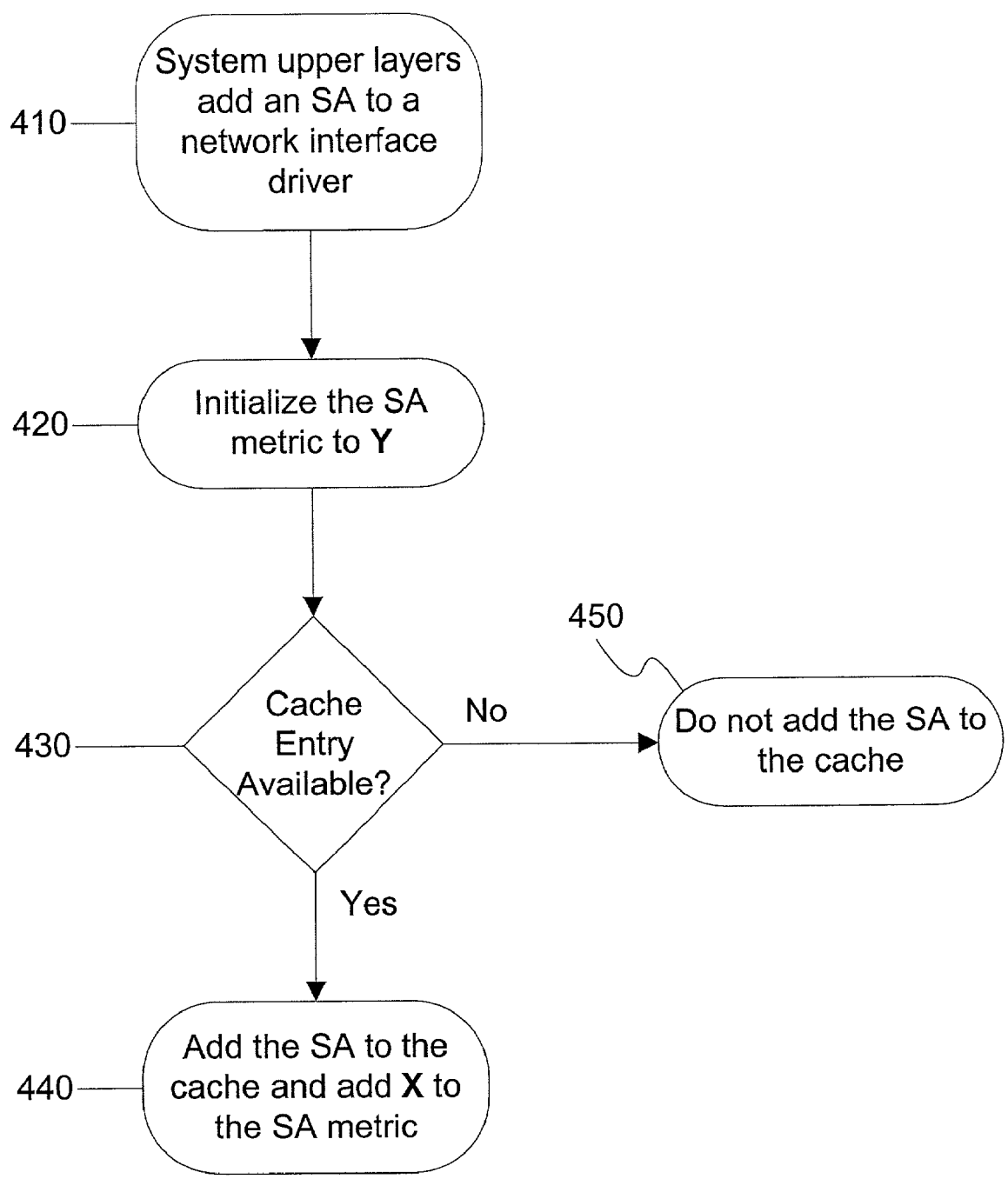
FIG. 4 is one embodiment of a flow diagram for adding a security association to a driver agent.

FIG. 4 is one embodiment of a flow diagram for adding an SA to a driver agent. In one embodiment, the upper system layers add an SA to a network interface driver, 410. The upper layers can be, for example, an OS or another application that performs control functions. A network interface driver is one embodiment of a driver agent. In one embodiment, the SA is added to the network interface driver by the upper layers as one step in the execution of a set of instructions for offloading a received packet.

The SA added in 410 is associated with an SA metric and initialized to a predetermined value Y, 420. In one embodiment, Y is a value greater than zero that is selected based on experimentation, for example, 10,000.

The driver agent determines whether there is a cache entry available, 430. If there is a cache entry available, the SA is added to the cache and a value X is added to the SA metric, 440. In one embodiment, the value of X is predetermined based on experimentation, for example, 10,000. Adding X to the SA metric according to the present invention will give advantage to the SA added to the cache so that it is likely remain in the cache. If there is no cache entry available, the SA is not added to the cache, 450. In one embodiment, SAs not cached remain in an SA table in system memory.

Figure 5:
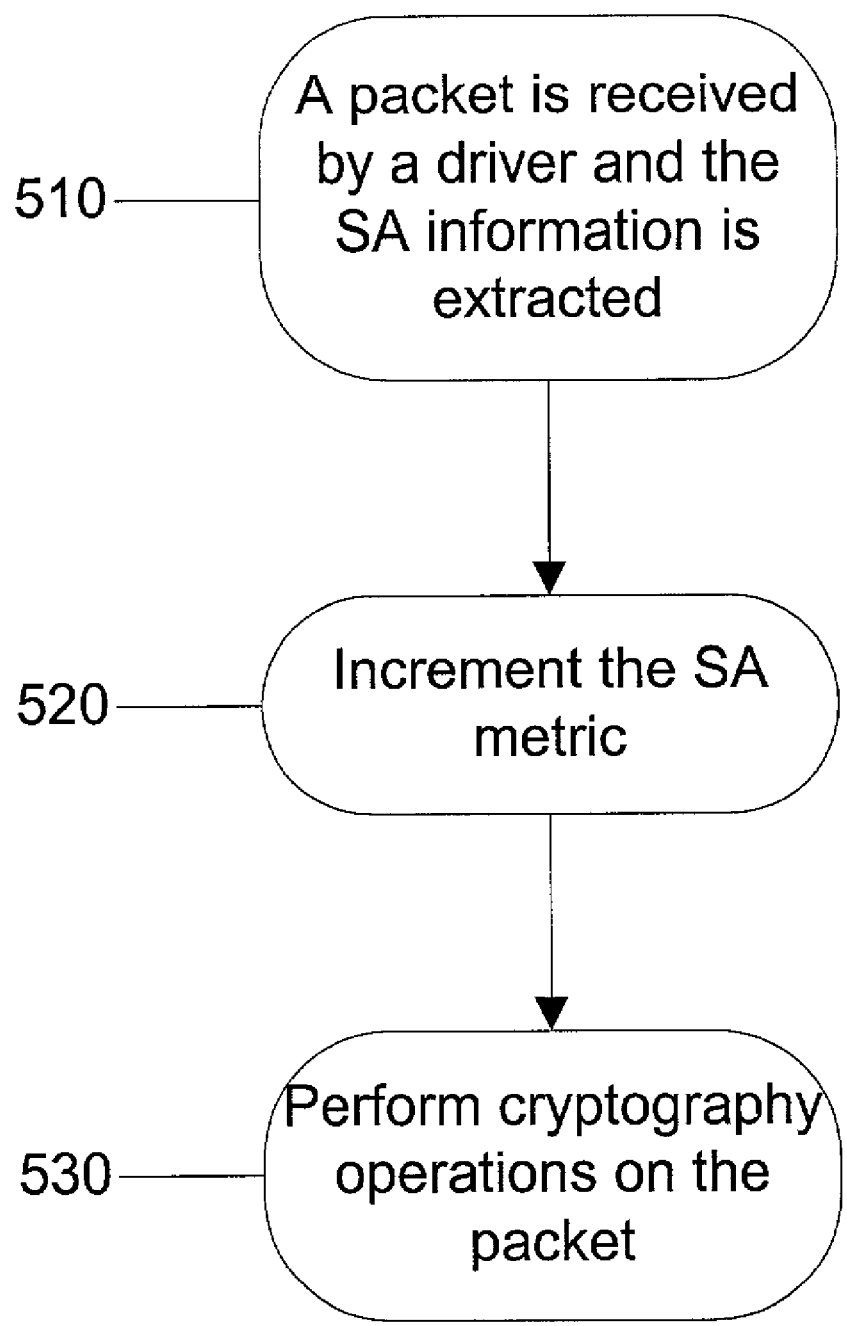
FIG. 5 is one embodiment of a flow diagram for handling a packet received by a driver agent.

FIG. 5 is one embodiment of a flow diagram for handling a packet received by a driver agent. In one embodiment, a packet associated with a traffic stream is received by a driver agent and the SA information is extracted, 510. For example, a packet can be received by a NIC and DMA transferred to host memory, and a network interface driver can parse out its SA information. The SA information is extracted to determine which SA is associated with the packet, and contains all the information necessary to perform crypto operations on the packet.

In one embodiment, the metric value of the associated SA is incremented, 520. In one embodiment, for example, a driver agent will perform a numerical operation on the SA metric. Crypto operations are performed on the packet, 530. In one embodiment, for example, the driver agent will direct a NIC to perform crypto operations on the packet by Secondary Use. Alternatively, the packet may be handled using software processing with any crypto operation known in the art.

Figure 6:
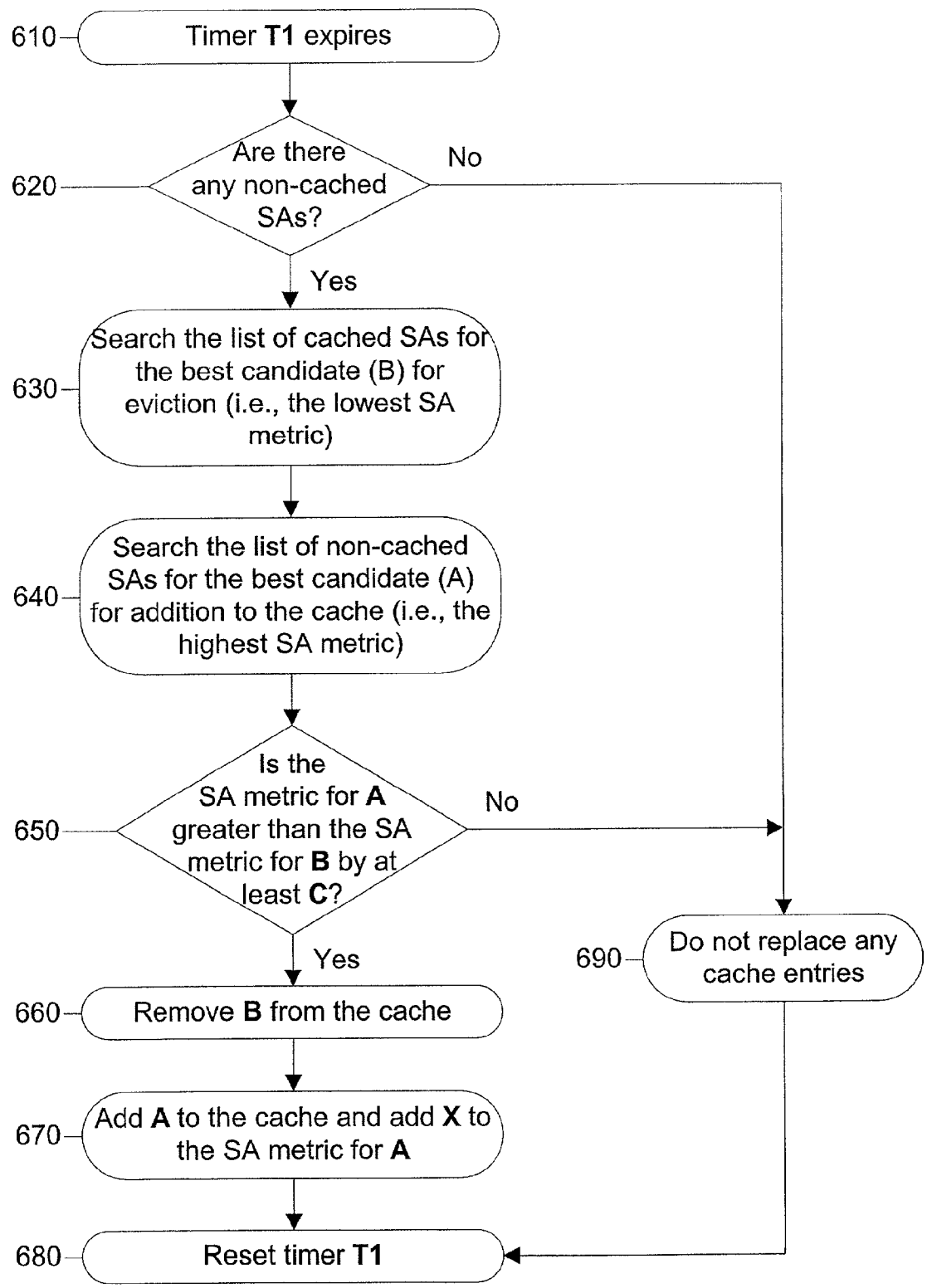
FIG. 6 is one embodiment of a flow diagram for replacing security association entries in a cache.

FIG. 6 is one embodiment of a flow diagram for replacement of SA entries in a cache. A timer T1 expires indicating a timeout condition, 610. A timer can be any form of counter, timer, capture and compare, or other device or method used to indicate to an electronic system process when a time-dependent operation or series of operations should be performed. Detection of the timeout condition may be performed by either software or hardware interrupt, by timer functions provided by the operating system, or by polling. In one embodiment, the timeout period for T1 is determined by experimentation to minimize SA replacement cost, for example, one second. Thus, cache replacement is performed based on time, rather than caused by a cache miss.

In one embodiment, the expiration of timer T1 indicates to a system that a predetermined policy for cache replacement should be performed. For example, a system processor can have a timer that causes an interrupt on overflow to indicate when to execute a command to a driver agent to perform a function for determining whether entries in an SA cache on a NIC should be replaced. For example, a cache replacement feature can enable a driver agent to perform a cost-based analysis to determine when a cached SA should be replaced by a non-cached SA.

It is determined whether there are any non-cached SAs, 620. In one embodiment, SAs not in the cache will exist in memory within the system. For example, SAs not in an SA cache on a NIC can be stored in an SA table in system memory. If all SAs are cached, no entries will be replaced, 690. If there are non-cached SAs, the list of cached SAs is searched for the best candidate (B) for eviction, 630. In one embodiment, B is the SA with the lowest SA metric value. For example, the metric associated with cached SA B may be periodically decreased by a driver agent, and the traffic stream associated with B may concurrently have a long period of disuse, resulting in a low SA metric value.

The list of non-cached SAs is searched for the best candidate (A) for addition to the cache, 640. In one embodiment, A is the SA with the highest SA metric value. For example, an SA metric associated with A may be increased by a driver agent if A is added to the driver agent, and the traffic stream may be highly active, resulting in a high SA metric value.

The SA metric values of A and B are compared, 650. In one embodiment, A will only be added to the cache if the metric value of A is greater than B by at least C. In one embodiment, C is a predetermined value based on experimentation that estimates the cost of cache entry replacement, for example, 100. For example, C may be a high number if cache replacement results in large delays or packet loss, or C may be zero if there is little or no cost associated with cache replacement. If the value of the SA metric for A is not greater than the SA metric for B by at least C, no cache entries will be replaced, 690. If the SA metric for A is greater than the SA metric for B by at least C, then B is removed from the cache, 660.

A is added to the cache and the value X is added to the SA metric for A, 670. In one embodiment, X is a predetermined value based on experimentation, for example, 10,000. Adding X to the SA metric for A gives advantage to A so that it is likely remain in the cache. Timer T1 is reset, 680.

Figure 7:
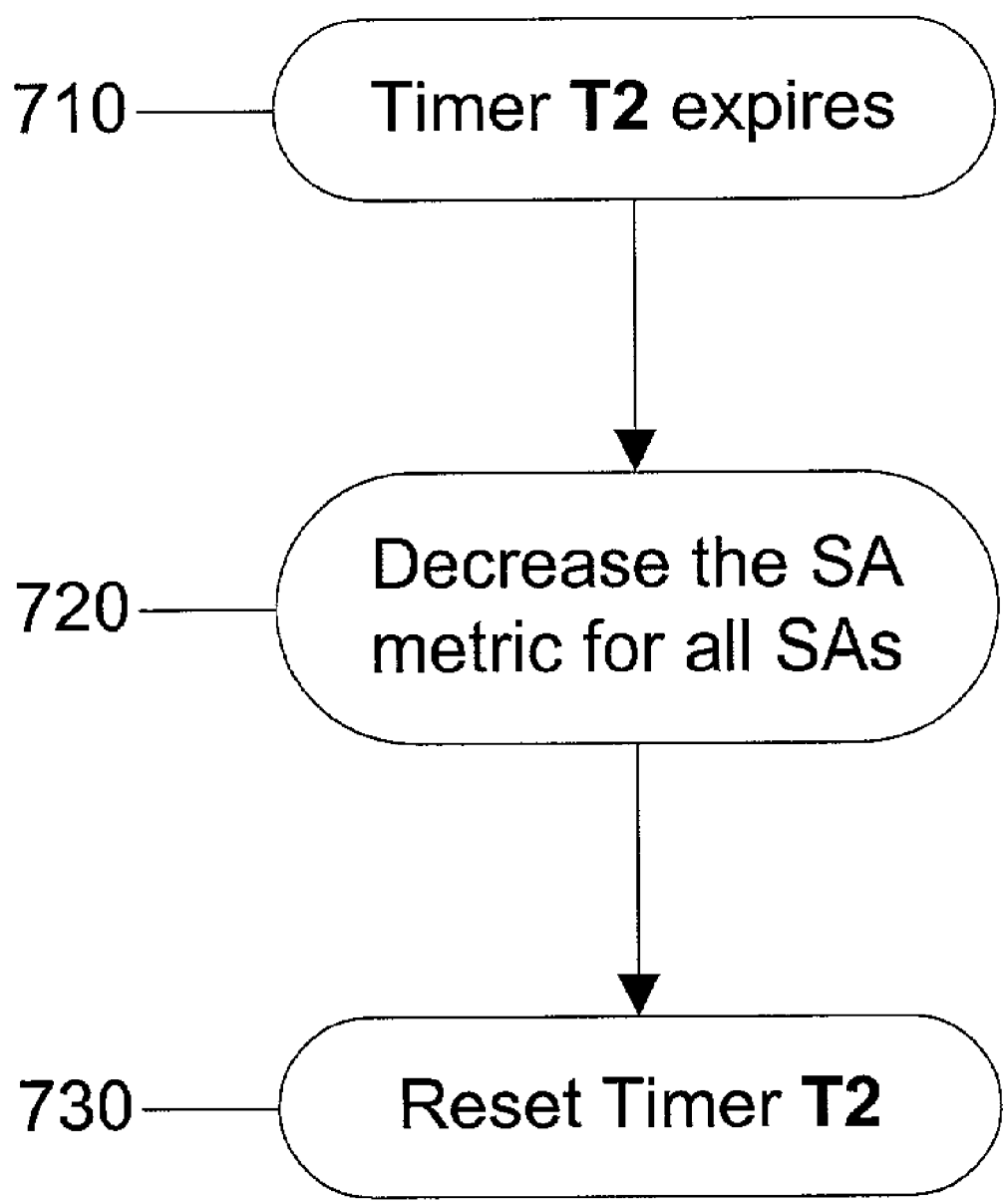
FIG. 7 is one embodiment of a flow diagram for decreasing the value of a security association metric.

FIG. 7 is one embodiment of a flow diagram for decreasing the value of the metrics of the SAs. A timer T2 expires indicating a timeout condition, 710. A timer can be any form of counter, timer, capture and compare, or other device or method used to indicate to a computer system process when a time-dependent operation or series of operations should be performed. Detection of the timeout may be performed by either software or hardware interrupt, or by polling. The timeout period for T2 is determined by experimentation, for example, one second.

In one embodiment, the expiration of timer T2 indicates to a system that a predetermined policy for decreasing the SA metric value of all SAs should be performed. Decreasing the SA metrics may be performed by subtracting a value from the SA metrics, by shifting the SA metric value to the right, or by dividing down the SA metrics. For example, a system processor can have a timer that causes an interrupt on overflow to indicate when to execute a command to a driver agent to perform a numerical operation to decrease the value of the SA metrics.

The value of the SA metric of all SAs is decreased, 720. For example, the driver agent can divide the metric values by two. In one embodiment, decreasing the SA metric value ages the metrics to give advantage to an SA that has more recent activity over a cached SA associated with a traffic stream that previously had heavy traffic that subsequently fell into disuse. Timer T2 is reset, 730.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

APPENDIX A

William E. Alford, Reg. No. 37,764; Farzad E. Amini, Reg. No. 42,261; William Thomas Babbitt, Reg. No. 39,591; Carol F. Barry, Reg. No. 41,600; Jordan Michael Becker, Reg. No. 39,602; Lisa N. Benado, Reg. No. 39,995; Bradley J. Bereznak, Reg. No. 33,474; Michael A. Bernadicou, Reg. No. 35,934; Roger W. Blakely, Jr., Reg. No. 25,831; R. Alan Burnett, Reg. No. 46,149; Gregory D. Caldwell, Reg. No. 39,926; Andrew C. Chen, Reg. No. 43,544; Thomas M. Coester, Reg. No. 39,637; Donna Jo Coningsby, Reg. No. 41,684; Florin Corie, Reg. No. 46,244; Dennis M. deGuzman, Reg. No. 41,702; Stephen M. De Klerk, Reg. No. P46,503; Michael Anthony DeSanctis, Reg. No. 39,957; Daniel M. De Vos, Reg. No. 37,813; Justin M. Dillon, Reg. No. 42,486; Sanjeet Dutta, Reg. No. P46,145; Matthew C. Fagan, Reg. No. 37,542; Tarek N. Fahmi, Reg. No. 41,402; Mark W. Farrell, Reg. No. 45,988; George Fountain, Reg. No. 37,374; James Y. Go, Reg. No. 40,621; James A. Henry, Reg. No. 41,064; Willmore F. Holbrow III, Reg. No. P41,845; Sheryl Sue Holloway, Reg. No. 37,850; George W Hoover II, Reg. No. 32,992; Eric S. Hyman, Reg. No. 30,139; William W. Kidd, Reg. No. 31,772; Sang Hui Kim, Reg. No. 40,450; Walter T. Kim, Reg. No. 42,731; Eric T. King, Reg. No. 44,188; George B. Leavell, Reg. No. 45,436; Kurt P. Leyendecker, Reg. No. 42,799; Gordon R. Lindeen III, Reg. No. 33,192; Jan Carol Little, Reg. No. 41,181; Robert G. Litts, Reg. No. 46,876; Julio Loza, Reg. No. 47,758; Joseph Lutz, Reg. No. 43,765; Michael J. Mallie, Reg. No. 36,591; Andre L. Marais, under 37 C.F.R. §10.9 (b); Paul A. Mendonsa, Reg. No. 42,879; Clive D. Menezes, Reg. No. 45,493; Chun M. Ng, Reg. No. 36,878; Thien T. Nguyen, Reg. No. 43,835; Thinh V. Nguyen, Reg. No. 42,034; Dennis A. Nicholls, Reg. No. 42,036; Daniel E. Ovanezian, Reg. No. 41,236; Kenneth B. Paley, Reg. No. 38,989; Gregg A. Peacock, Reg. No. 45,001; Marina Portnova, Reg. No. P45,750; Michael A. Proksch, Reg. No. 43,021; William F. Ryann, Reg. 44,313; James H. Salter, Reg. No. 35,668; William W. Schaal, Reg. No. 39,018; James C. Scheller, Reg. No. 31,195; Jeffrey S. Schubert, Reg. No. 43,098; George Simion, Reg. No. P47,089; Maria McCormack Sobrino, Reg. No. 31,639; Stanley W. Sokoloff, Reg. No. 25,128; Edwin H. Taylor, Reg. No. 25,129; Lance A. Termes, Reg. No. 43,184; John F. Travis, Reg. No. 43,203; Joseph A. Twarowski, Reg. No. 42,191; Kerry D. Tweet, Reg. No. 45,959; Mark C. Van Ness, Reg. No. 39,865; Thomas A. Van Zandt, Reg. No. 43,219; Lester J. Vincent, Reg. No. 31,460; Glenn E. Von Tersch, Reg. No. 41,364; John Patrick Ward, Reg. No. 40,216; Mark L. Watson, Reg. No. P46,322; Thomas C. Webster, Reg. No. P46,154; and Norman Zafman, Reg. No. 26,250; my patent attorneys, and Firasat Ali, Reg. No. 45,715; Richard Nakashima, Reg. No. 42,023, my patent agents of BLAKELY, SOKOLOFF, TAYLOR & ZAFMAN LLP, with offices located at 12400 Wilshire Boulevard, 7th Floor, Los Angeles, Calif. 90025, telephone (310) 207–3800, and and Alan K. Aldous, Reg. No. 31,905; Robert D. Anderson, Reg. No. 33,826; Joseph R. Bond, Reg. No. 36,458; Richard C. Calderwood, Reg. No. 35,468; Jeffrey S. Draeger, Reg. No. 41,000; Cynthia Thomas Faatz, Reg. No. 39,973; Sean Fitzgerald, Reg. No. 32,027; John F. Kacvinsky, Reg. No. 40,040; Seth Z. Kalson, Reg. No. 40,670; David J. Kaplan, Reg. No. 41,105; Charles A. Mirho, Reg. No. 41,199; Leo V. Novakoski, Reg. No. 37,198; Naomi Obinata, Reg. No. 39,320; Thomas C. Reynolds, Reg. No. 32,488; Kenneth M. Seddon, Reg. No. 43,105; Mark Seeley, Reg. No. 32,299; Steven P. Skabrat, Reg. No. 36,279; Howard A. Skaist, Reg. No. 36,008; Steven C. Stewart, Reg. No. 33,555; Robert G. Winkle, Reg. No. 37,474; Steven D. Yates, Reg. No. 42,242, and Charles K. Young, Reg. No. 39,435; my patent attorneys, Thomas Raleigh Lane, Reg. No. 42,781; Calvin E. Wells; Reg. No. P43,256, Peter Lam, Reg. No. 44,855; Michael J. Nesheiwat, Reg. No. P47,819; and Gene I. Su, Reg. No. 45,140; my patent agents, of INTEL CORPORATION; and James R. Them, Reg. No. 31,710, my patent attorney; with full power of substitution and revocation, to prosecute this application and to transact all business in the Patent and Trademark Office connected herewith.

What is claimed is:

1. A method comprising:
   associating a security association with a traffic stream;
   associating a metric value with the security association;
   modifying the metric value based on an amount of network traffic generated for the traffic stream;
   dynamically mapping the traffic stream to one of multiple components that perform cryptography operations based on the metric value;
   wherein dynamically mapping traffic streams to one of multiple components comprises selecting between performing cryptography operations with a driver agent and performing cryptography operations with a network interface using cached cryptography information; and wherein the dynamic mapping further comprises replacing a cached security association with a non-cached security association when the metric value of the non-cached security association differs from the metric value of the cached security associations by at least a predetermined amount.

2. The method of claim 1 wherein the dynamic mapping is performed using a time-based analysis.

3. The method of claim 1 wherein the multiple components comprise a driver agent and a network interface.

4. The method of claim 1 wherein the predetermined amount is selected based on a cost-based analysis.

5. The method of claim 1 wherein modifying the metric value further comprises initializing the metric to a predetermined value when the security association is received by a driver agent.

6. The method of claim 1 wherein modifying the metric value further comprises changing the associated metric value by a predetermined amount when the security association is added to a cache.

7. The method of claim 1 wherein modifying the metric value further comprises changing the associated metric value when a packet is received.

8. The method of claim 1 wherein modifying the metric value further comprises periodically changing the metric value independent of network traffic.

9. An apparatus comprising:
a network interface of a Network Interface Card coupled to receive network traffic streams; and
a driver agent coupled to communicate with the network interface, the driver agent to associate a security association with a traffic stream, associate a metric value with the security association, modify the metric value of the security association based on how much network traffic is received for the traffic stream, and dynamically map the traffic stream to one of multiple components that perform cryptography operations based on the metric value;
wherein dynamically mapping traffic streams to one of multiple components comprises selecting between performing cryptography operations with a driver agent and performing cryptography operations with a network interface using cached cryptography information; and
wherein the dynamic mapping further comprises replacing a cached security association with a non-cached security association when the metric value of the non-cached security association is greater than the metric value of the cached security association by at least a predetermined amount.

10. The apparatus of claim 9 wherein the dynamic mapping is performed using a time-based analysis.

11. The apparatus of claim 9 wherein the multiple components comprise a driver agent and a network interface.

12. The apparatus of claim 9 wherein the predetermined amount is selected based on a cost-based analysis.

13. The apparatus of claim 9 wherein modifying the metric value further comprises initializing the metric to a predetermined value when the security association is received by a driver agent.

14. The apparatus of claim 9 wherein modifying the metric value further comprises changing the associated metric value by a predetermined amount when the security association is added to a cache.

15. The apparatus of claim 9 wherein modifying the metric value further comprises changing the associated metric value when a packet is received.

16. The apparatus of claim 9 wherein modifying the metric value further comprises periodically changing the metric value independent of network traffic.

17. An article of manufacture comprising a machine-accessible medium with instructions stored thereon to provide machine-readable instructions that, when executed, cause one or more electronic systems to:
associate a security association with a traffic stream;
associate a metric value with the security association;
modify the metric value based on an amount of network traffic generated for the traffic stream;
dynamically map the traffic stream to one of multiple components that perform cryptography operations based on the metric value;
wherein dynamically mapping traffic streams to one of multiple components comprises selecting between performing cryptography operations with a driver agent and performing cryptography operations with a network interface using cached cryptography information; and
wherein the dynamic mapping further comprises replacing a cached security association with a non-cached security association when the metric value of the non-cached security association is greater than the metric value of the cached security association by at least a predetermined amount.

18. The article of claim 17 wherein the dynamic mapping is performed using a time-based analysis.

19. The article of claim 17 wherein the multiple components comprise a driver agent and a network interface.

20. The article of claim 17 wherein the predetermined amount is selected based on a cost-based analysis.

21. The article of claim 17 wherein modifying the metric value further comprises initializing the metric to a predetermined value when the security association is received by a driver agent.

22. The article of claim 17 wherein modifying the metric value further comprises changing the associated metric value by a predetermined amount when the security association is added to a cache.

23. The article of claim 17 wherein modifying the metric value further comprises changing the associated metric value when a packet is received.

24. The article of claim 17 wherein modifying the metric value further comprises periodically changing the metric value independent of network traffic.

25. A method comprising:
associating a security association with a traffic stream;
associating a metric value with a security association;
initializing the metric value to a predetermined value when the security association is received by a driver agent, the metric value to be modified based at least in part on traffic generated for the associated traffic stream;
determining whether the security association necessary for performing cryptography operations on a packet of the traffic stream is cached;
determining whether the security association should be cached based on the metric value;
wherein determining whether the security association should be cached further comprises:
increasing the value of the metric value by a predetermined amount when the associated security association is added to a cache;

incrementing the value of the metric value when a packet for the associated traffic stream is received; and determining whether the metric value is greater than the lowest metric value of cached security associations by at least a predetermined amount, caching the security association if it is determined from the metric value that the security association should be cached.

26. The method of claim 25 further comprising periodically decreasing the metric value.

27. The method of claim 25 further comprising periodically evaluating the metric value to determine whether the security association should be cached.

* * * * *